Sept. 15, 1931.  H. F. SCRUBY  1,823,065
MACHINE FOR TRUING BRAKE BAND SEGMENTS
Filed Oct. 8, 1929
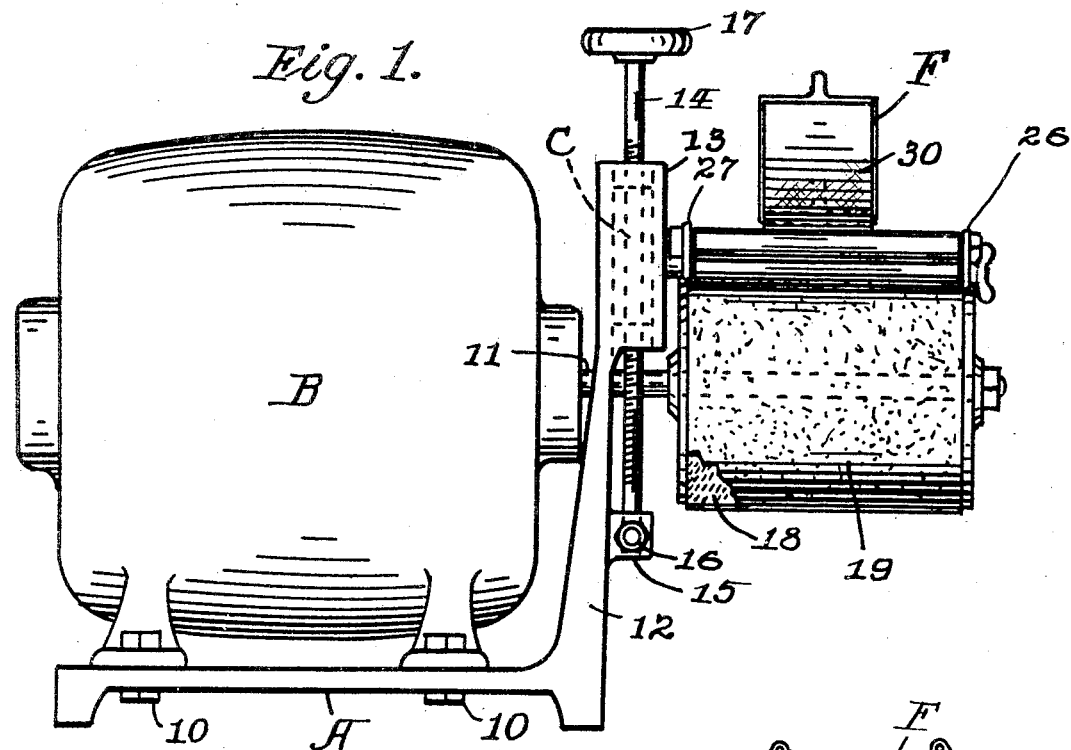
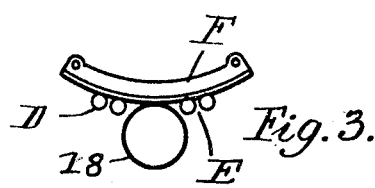
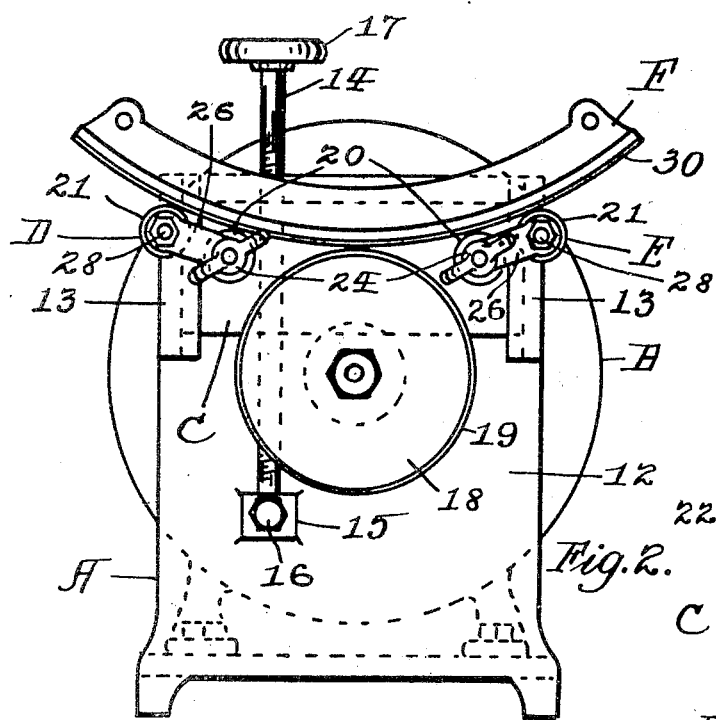
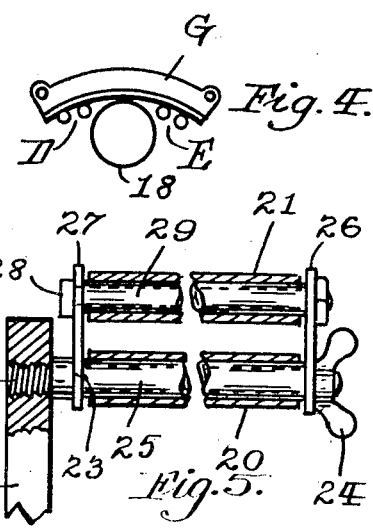
INVENTOR:
Horace F. Scruby,
BY
ATTORNEY Patented Sept. 15, 1931

1,823,065

UNITED STATES PATENT OFFICE

HORACE F. SCRUBY, OF BEVERLY HILLS, CALIFORNIA

MACHINE FOR TRUING BRAKE BAND SEGMENTS

Application filed October 8, 1929. Serial No. 398,204.

Brake lining for motor vehicles is frequently composed of a combination of metal and fiber fabrics bonded together by rubber or other suitable material and formed into a suitable strip which is usually secured by rivets or other suitable means to the outer or inner brake engaging elements and adapted to impart friction between revoluble and stationary members when the brakes are used. This material is usually applied between the cooperating drum and band segments of the internal or external foot, hand or automatically operated brake members. When newly applied to the circular surfaces of said members the surface of said brake lining strip is usually uneven and when the brake is unapplied drags in spots. It is the primary object of this invention to provide means which can be used by the ordinary and not necessarily highly skilled repair man to true the surface of the brake lining by grinding or cutting after it has been newly applied to brake segments. A further object is the production of an adjustable device of the kind stated which is simple and inexpensive in construction and effective in use and which can be easily and quickly converted for use in truing and evenly surfacing either external or internal brake bands.

In the accompanying drawings forming part of this specification, Fig. 1 is a side elevation of my invention; Fig. 2 is an end elevation of the structure shown in Fig. 1, illustrating an external brake band segment in position while its brake band surface is being trued; Figs. 3 and 4 are diagrammatic views showing the position the parts assume when used for truing the surface of the brake lining on an external or internal brake band segment, and Fig. 5 is a plan partly in section and broken away of a detail showing the construction of the rests.

In the drawings, A indicates a stand upon which an electric motor B is detachably secured by the bolts 10 with its driven shaft 11 projecting from one end. Said stand has an upwardly projecting support 12 through which the shaft 11 projects, said support being formed with a pair of oppositely disposed inwardly facing vertical guide channels 13. These guide channels hold a vertically movable carriage C, said carriage being adjusted by a vertical shaft 14, which is threaded in said carriage and revolubly secured by its lower end in a socket 15 on the face of the support 12, by the bolt 16. By turning the hand piece 17 the shaft is revolved and moves the carriage up or down. The shaft 11 of the motor carries a cylindrical expansion body 18 upon which a band 19 of abrasive or cutting material is revolved, said body and band constituting a trimmer having a cutting periphery against which the surface of the brake band on a brake band segment may be presented to trim and true the brake lining after it is applied to the segment.

Arranged above and on either side and parallel with the axis of the trimmer are two pairs of rests D and E, each pair being mounted upon the carriage and movable vertically therewith. Each rest has two antifriction rollers 20 and 21, the roller 20 being freely revoluble about a stud bolt 22 which is rigidly secured into the carriage C. Placed upon said stud bolt and clamped against an inner shoulder 23 by a thumb nut 24 is a sleeve 25 and a pair of radiating supporting arms 26 and 27, said arms forming an outwardly extending pair of supports which are radially adjustable for the second antifriction roller 21. A bolt 28 carrying a spacing sleeve 29 upon which the roller 21 is journaled serves to secure the outer ends of the arms 26 and 27 to the journal support for the roller 21. By this means the outer pair of rollers 21 may be radially adjusted to support the segment F, having brake band 30, the surface of which is to be trued slidable back and forth over the peripheral cutting surface of the trimmer without interruption even should the band be in sections spaced endwise slightly apart. In Figs. 2 and 3 the rests are adjusted to guide an internal brake segment F with its brake band in coaction with the periphery of the trimmer. In Fig. 4 the rests are readjusted into position to guide an external brake segment G with its brake band in coaction with the periphery of the trimmer. This change of adjustment may be easily made by loosening and tightening the nut 24. By turning the shaft 14 the depth of cut made by the trimmer may be adjusted from time to time as desired.

In accordance with the patent statutes, I have described the principles of operation of my invention, together with the construction thereof which I now consider to represent the best embodiment thereof but I desire to have it understood that the construction shown is only illustrative and that the invention can be carried out by other means and applied to uses other than those above set forth within the scope of the following claims.

Having described my invention what I claim as new and desire to secure by Letters Patent is:

1. A device for truing the surface of brake lining carried by a brake band segment or the like, comprising, in combination, a revoluble trimmer having a cutting periphery, a pair of antifriction rests the members of which are disposed at opposite sides of said trimmer, adapted to guide said segment with its curved brake surface in an arc about an axis eccentric to said trimmer and with the external surface of its brake lining in coaction with the periphery of said trimmer to trim said surface coincident with the movement of said segment about its axis, said trimmer being adjustable to and from said rests and each of said rests consisting of a pair of antifriction supports for said segment, movably disposed to be adjusted into different positions, whereby either internal or external brake band segments may be presented for coaction with said trimmer to trim their brake bands.

2. A device for trimming the surface of brake lining carried by brake band segments or the like, comprising, a revoluble trimmer having a cutting periphery and means for holding and guiding said segments with their curved brake surfaces in an arc about an axis eccentric to said trimmer to trim and true said surfaces coincident with the movement of said segments, said holding and guiding means consisting of a pair of rests disposed at opposite sides of said trimmer and each of said rests comprising a pair of guides adjustable into different angular positions, whereby both internal and external brake band segments can be presented to and guided about said trimmer to accurately trim said surfaces.

3. A device for trimming the surface of brake lining carried by brake band segments or the like, comprising, in combination, a frame, a motor secured to said frame, a revoluble trimmer on the shaft of said motor, and rests adjustably carried at opposite sides of said trimmer on said frame and disposed to guide said segments with their curved surfaces in an arc about an axis eccentric to the axis of said trimmer and with the surfaces of the brake lining in coaction with the periphery of said trimmer to trim said surfaces coincident with the movement of said segments about their axes.

4. A device for trimming the surfaces of brake lining carried by internal and external brake band segments, comprising in combination, a motor having a drive shaft, a trimmer revolubly carried by said shaft, and a pair of guides supported adjacent to the motor on opposite sides of said trimmer, said guides being movable into positions whereby both internal and external brake band segments can be guided in arcs about axes eccentric to the periphery of the trimmer to trim the surfaces of their brake lining.

5. A device for trimming the surfaces of brake lining carried by internal and external brake band segments, comprising, in combination, a motor having a drive shaft, a trimmer revolubly carried by said shaft, a frame secured to the motor, a support movable across the axis of the trimmer in said frame, means for adjusting said support in said frame, guides carried by said support on opposite sides of said trimmer, each of said guides comprising a plurality of guiding members adjustably arranged to be regulated in angular position whereby both internal and external brake bands can be guided in different arcs eccentric to the trimmer to permit trimming of the surfaces of brake bands carried by both internal and external brake band segments by the trimmer.

In witness whereof, I have signed my name to this specification.

HORACE F. SCRUBY.